Patented Apr. 25, 1933

1,905,517

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSE ESTER COMPOSITION OF MATTER CONTAINING THE TETRAETHYL ESTER OF A TETRACARBOXYL DERIVATIVE OF A SATURATED ALIPHATIC HYDROCARBON

No Drawing. Application filed August 10, 1931. Serial No. 556,329.

This invention relates to compositions of matter in which cellulose esters, such as cellulose acetate or cellulose nitrate, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets or tissues, photographic film, artificial silk, molding compounds or products, varnishes or lacquers and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of celluloid. Other objects will become apparent to those skilled in the art to which this invention pertains.

While cellulose acetate and nitrate have been known for decades, it has also been known that to utilize them in various plastic arts it is necessary to mix therewith such plasticizing or conditioning agents as triphenylphosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate and nitrate to prepare them for use in the other plastic arts, such as in the manufacture of lacquers, varnishes, artificial silk filaments, molded compounds and the like. While the plasticizers or other addition agents heretofore discovered have had their utility in the art, the increasing use to which cellulose esters have been put and the increasing number of desirable properties required of the cellulose esters for most purposes has made the discovery of new and economical plasticizers or other addition agents a matter of considerable importance to the art.

I have discovered that valuable properties may be induced in and/or contributed to compositions containing cellulose esters, such as cellulose acetate or cellulose nitrate, by adding thereto as a plasticizing compound the tetraethyl ester of a tetracarboxyl derivative of a saturated aliphatic hydrocarbon, together with a solvent, such as acetone, which will dissolve both the cellulose derivative and plasticizer. These plasticizers have the general formula

$$C_nH_{2n-2}(COO.C_2H_5)_4.$$

Examples of these plasticizers are the tetraethyl ester of 1:1:2:2-tetracarboxyl ethane,

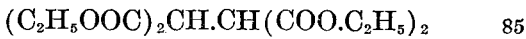

$$(C_2H_5OOC)_2CH.CH(COO.C_2H_5)_2$$

and the tetraethyl ester of 1:1:2:3-tetracarboxyl propane,

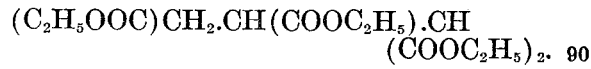

$$(C_2H_5OOC)CH_2.CH(COOC_2H_5).CH(COOC_2H_5)_2.$$

They are compatible with cellulose derivatives in the percentages hereinafter given. The particularly useful properties which they induce in or contribute to cellulosic compositions containing them are hereinafter enumerated.

The method of preparation of the tetraethyl ester of 1:1:2:2-tetracarboxyl ethane is described by Conrad and Bischoff in Liebig's Annalen, vol. 214, pages 68–69

(1882). The tetraethyl ester of 1:1:2:3-tetracarboxyl propane may be prepared as follows: In a 5-liter flask fitted with stirrer, reflux condenser, and dropping funnel is placed 1900 g. of absolute ethyl alcohol. 92 g. of sodium cut into small chunks is added through the condenser, the flask being cooled by running water over the surface. When all the sodium is in solution, the flask is cooled and 800 g. of ethyl malonate is added through the condenser with stirring. The mixture is then warmed slightly and 698 g. of ethyl fumarate is added from the dropping funnel, while the solution is gently refluxed (steam being used if necessary). After all the ethyl fumarate has been added, the refluxing is continued for one hour. The mixture is then cooled, and 250 g. of glacial acetic acid is added. Most of the alcohol is distilled off under reduced pressure on the steam bath, and the residue is poured into sufficient distilled water to dissolve all the solid. The water layer is separated, and extracted three or four times with carbon tetrachloride. The carbon tetrachloride is distilled off at normal pressure from a column flask, carrying the water over with it. The residue is then vacuum distilled, the tetraethyl ester of 1:1:2:4-tetracarboxyl propane distilling over at 192–195° C. at 13 mm. pressure.

In order that those skilled in this art may better understand my invention I would state, by way of illustration, that for the manufacture of photographic film or other sheets my new composition of matter may be compounded as follows: 100 parts of acetone soluble cellulose acetate, that is, cellulose acetate containing from 38% to 42% acetyl radical, approximately, is dissolved with stirring at atmospheric temperature in 300 to 500 parts, preferably 400 parts, by weight, of acetone. To this solution may be added from 10 to 60 parts by weight of the tetraethyl ester of 1:1:2:2-tetracarboxyl ethane or the tetraethyl ester of 1:1:2:3-tetracarboxyl propane. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectitvely.

A composition of matter prepared as above described may be deposited upon any suitable film-forming surface to form a film or sheet, in a manner well known to those skilled in the art. A film so produced has permanently brilliant transparency (even where as much as 50 to 60 parts of the plasticizer per 100 parts of cellulose derivative, such as cellulose acetate or nitrate, is used) and low inflammability, burning no more readily than ordinary newsprint. A film containing from 20 to 30 parts of the tetraethyl ester of 1:1:2:2-tetracarboxyl ethane per 100 parts of cellulose ester, such as cellulose acetate or nitrate, has the unexpected property of superior flatness—a property which is much sought for in the art but seldom discovered. Films or sheets produced in accordance with my invention are quite tough and flexible. For instance, films of celluose acetate plasticized with 30% to 50% (parts by weight based on the cellulose acetate) of the tetraethyl ester of 1:1:2:3-tetracarboxyl propane has an initial flexibility of 50% to 400% higher than film containing no plasticizer. Films of cellulose nitrate plasticized with 20% of the tetraethyl ester of 1:1:2:3-tetracarboxyl propane or of the tetraethyl ester of 1:1:2:2-tetracarboxyl ethane had a flexibility of 50% higher than film containing no plasticizer. Furthermore, film so plasticized maintains flexibility in a superior fashion. For instance, film containing 50% of the tetraethyl ester of 1:1:2:3-tetracarboxyl propane maintained flexibility at 100° C. for over 100 days whereas an unplasticized film became brittle in 42 days, all of which demonstrates that films so plasticized will withstand ordinary usage satisfactorily for many years.

Other similar solvents (instead of acetone) which are compatible with cellulose acetate or cellulose nitrate and my new plasticizers may also occur to those skilled in this art. In like manner these plasticizers may be compounded with other single organic esters of cellulose, such as cellulose propionate, butyrate and the like, or with mixed organic and/or inorganic esters, such as cellulose aceto-stearate, cellulose aceto-malate, or cellulose nitro-acetate, a suitable solvent which will dissolve both the cellulose derivative and the plasticizer being employed.

Inasmuch as my above-described compositions of matter are quite useful in the production of films and sheets it will be apparent that my new plasticizers may also be employed with advantage in the other branches of the plastic art. For instance, my above-described compositions of matter may be employed in the manufacture of artificial silk by the dry-spinning method. With the proper coagulating bath they may also be employed for wet spinning. It may be desired to employ compositions of different viscosity or evaporation characteristics but this is a mere matter of changing the solvent proportion or adding evaporation retardents or other high or intermediate boiling constituents, as has been well known in the art for more than a decade. My novel plasticizers may also be employed with advantage in connection with a number of the known lacquer and varnish formulæ with which they may be found to be compatible. In such cases the plasticizer is usually first put into solution with the cellulose derivative solution, and if non-solvents are added for the purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

The tetraethyl esters of 1:1:2:2-tetracarboxyl ethane and 1:1:2:3-tetracarboxyl propane may also be advantageously used as plasticizers in cellulose acetate molding compositions. For instance, when from 20% to 30% (parts by weight based on the cellulose acetate) of the tetraethyl ester of 1:1:2:3-tetracarboxyl propane is homogeneously mixed with cellulose acetate, this mixture may be converted into a hard, translucent plastic product by molding at a temperature of 150° C. and a pressure of 4000 pounds per square inch for a period of from 1 to 3 minutes, in a manner already known to those skilled in holding compounds of that nature.

What I claim as my invention and desire to be secured by Letters Patent of the United States is:

1. A composition of matter comprising a cellulose ester and the tetraethyl ester of a tetracarboxyl derivative of a saturated lower aliphatic hydrocarbon.

2. A composition of matter comprising cellulose nitrate and the tetraethyl ester of a tetracarboxyl derivative of a saturated lower aliphatic hydrocarbon.

3. A composition of matter comprising cellulose acetate and the tetraethyl ester of a tetracarboxyl derivative of a saturated lower aliphatic hydrocarbon.

4. A composition of matter comprising a cellulose ester and the tetraethyl ester of 1:1:2:2-tetracarboxyl ethane.

5. A composition of matter comprising a cellulose ester and the tetraethyl ester of 1:1:2:3-tetracarboxyl propane.

6. A composition of matter comprising 100 parts of a cellulose ester and from about 10 to 60 parts, by weight, of the tetraethyl ester of a tetracarboxyl derivative of a saturated lower aliphatic hydrocarbon.

7. A relatively thin sheet having the property of maintaining its original flatness and comprising a cellulose ester and the tetraethyl ester of 1:1:2:2-tetracarboxyl ethane.

8. A relatively thin sheet having the property of maintaining its original flatness and comprising 100 parts of a cellulose ester and approximately 20 to 30 parts, by weight, of the tetraethyl ester of 1:1:2:2-tetracarboxyl ethane.

9. A molding composition adapted to molding under elevated temperatures and high pressures, comprising cellulose acetate and the tetraethyl ester of a tetracarboxyl derivative of a saturated lower aliphatic hydrocarbon.

10. A molding composition adapted to molding under elevated temperatures and high pressures, comprising 100 parts of cellulose acetate and approximately 20 to 30 parts, by weight, of the tetraethyl ester of a tetracarboxyl derivative of a saturated lower aliphatic hydrocarbon.

Signed at Rochester, New York, this 31st day of July, 1931.

HENRY B. SMITH.

CERTIFICATE OF CORRECTION.

Patent No. 1,905,517. April 25, 1933.

HENRY B. SMITH.

It is hereby certified that error appears in the printed specification of the above numbered patent requiring correction as follows: Page 2, line 29, for the figure "4" read "3"; page 3, line 27, for "holding" read "molding"; and that the said Letters Patent should be read with these corrections therein that the same may conform to the record of the case in the Patent Office.

Signed and sealed this 30th day of May, A. D. 1933.

(Seal)

M. J. Moore.
Acting Commissioner of Patents.